United States Patent [19]

De La Cierva

[11] 3,910,693

[45] Oct. 7, 1975

[54] GYROSCOPIC IMAGE MOTION COMPENSATOR FOR A MOTION PICTURE CAMERA

[76] Inventor: Juan J. De La Cierva, Apolonio Morales 21, Madrid 6, Spain

[22] Filed: Jan. 24, 1974

[21] Appl. No.: 436,354

[30] Foreign Application Priority Data
Jan. 25, 1973 Spain .................................. 410960

[52] U.S. Cl. ...................... 352/244; 354/70; 350/16
[51] Int. Cl.² ..................... G03B 19/00; G02B 23/00
[58] Field of Search ...... 352/139, 140, 244; 354/70; 350/16; 356/149; 33/226

[56] References Cited
UNITED STATES PATENTS

| | | | |
|---|---|---|---|
| 2,886,972 | 5/1959 | Plsek | 350/16 |
| 3,409,350 | 11/1968 | Call | 350/16 X |
| 3,424,520 | 1/1969 | Call | 350/16 |
| 3,424,521 | 1/1969 | Koppensteiner | 350/16 |
| 3,424,522 | 1/1969 | Call | 350/16 |
| 3,468,596 | 9/1969 | Alvarez | 350/16 |
| 3,558,212 | 1/1971 | Ritchie | 350/16 |
| 3,728,948 | 4/1973 | Fraser | 350/16 |
| 3,756,687 | 9/1973 | Shin | 350/16 |
| 3,762,795 | 10/1973 | Bezu | 350/16 |

*Primary Examiner*—Samuel S. Matthews
*Assistant Examiner*—Alan Mathews
*Attorney, Agent, or Firm*—Lewis H. Eslinger; Alvin Sinderbrand

[57] ABSTRACT

In a motion picture camera having a variable focal length lens system including a focal converter and a film exposure window formed therein, behind which film to be exposed passes, an image-movement compensation device is provided for improving the definition of images recorded by the camera when the camera is subjected to vibrations. The image movement compensation device includes a reflecting element mounted in the camera to reflect a collimated light beam from the focal converter to the film passing the exposure window. The reflecting element is mounted for pivotal movement in the camera at the point of incidence of the light beam therewith in the elevation and azimuth planes. A magnetically damped gyroscopic stabilization means controls the spatial position of the reflecting element in the camera through a transmission means operatively connected therebetween. By this arrangement the light beam reflected from the reflecting element to the film is substantially unaffected by vibrations to which the camera is subjected and the point of incidence of the reflected light beam on the surface of the film at the exposure window remains constant.

6 Claims, 13 Drawing Figures

GYROSCOPIC IMAGE MOTION COMPENSATOR FOR A MOTION PICTURE CAMERA

SCOPE OF THE INVENTION

The filming of motion pictures almost always requires total or near total immobility of the camera, to thus isolate it from involuntary movements of the operator. Professionals normally solve the problem by mounting very large cameras on tripods and installing them on gimbals with complex lubrication systems.

However, this solution is often impractical, particularly when the camera must be hand-operated, as occurs in most on-the-spot news filming or, as is generally the case, when the operator does not wish to use a clumsy and troublesome tripod.

In addition, the problem of image movement is especially aggravated when camera and operator are installed on a moving vehicle. In such cases, the operator receives from the vehicle mechanical impulses of irregular frequency and amplitude which generally he is unable to compensate. In these cases the resulting image is practically useless.

Thus the object of this invention is to provide an arrangement for improving the definition of images recorded by a motion picture camera subjected to vibrations.

The arrangement according to the invention for improving the definition of images recorded by a motion picture camera subjected to vibratory motion, which camera includes a zoom lens, an element for reflecting the collimated light beam proceeding from the afocal converter of said lens to thus direct it to a film exposure window through the main lens of the cited lens assembly, and means for making unexposed film pass behind said exposure window, is characterized in that it contains means for supporting said reflection element so that at the point of incidence of the collimated light beam it can normally swing on an elevation plane and on an azimuth plane; means of gyroscopic stabilization capable of sustaining a fixed position in space when the camera receives brusque movement of low amplitude, and means for interconnecting the cited means of reflection and cited means of gyroscopic stabilization, the latter controlling said reflection means through adequate motion transmission means to change the spatial position of the mentioned reflection means so that the light beam reflected therefrom to said unexposed film is not affected by the vibrations to which the camera is subjected, the angle of incidence of said stabilized collimated light beam remaining constant on the surface of said film.

Another object of the invention is to provide an arrangement of the type mentioned characterized in that the afocal portion of the visual field of the lens unit forming the lens assembly of the camera is wider than usual and in that the requirements of the visual field are those normally associated with the lens used, plus the angle of correction required to avoid reduced illumination at the edges of the image due to compensation movements made by the reflection element.

Yet another object of this invention is an arrangement of the type mentioned, characterized in that the cited reflection element is mounted inside a camera in a swivel-based frame so that it can tilt horizontally and vertically in response to the compensating motion transmitted from the means of gyroscopic stabilization, which in turn are hung by cardan suspension and are capable of changing their gear ratio with the gyroscopic system in response to the action upon them of the adjustment movements of the actual lens assembly focal length transmitted thereto by an adequate mechanism.

Still another object of this invention is the creation of a stabilizing arrangement characterized in that the cited interconnection means are designed considering the 1:2 ratio of the motion required on the main plane (elevation), as well as the 1:1 ratio of the motion required on the normal plane (azimuth), multiplied on both planes by a factor proportional to that of increase or reduction of the afocal converter.

The following is a detailed description of a perferred embodiment of the object of this application, given only as an example, with reference to the attached drawings wherein.

Figure 1:
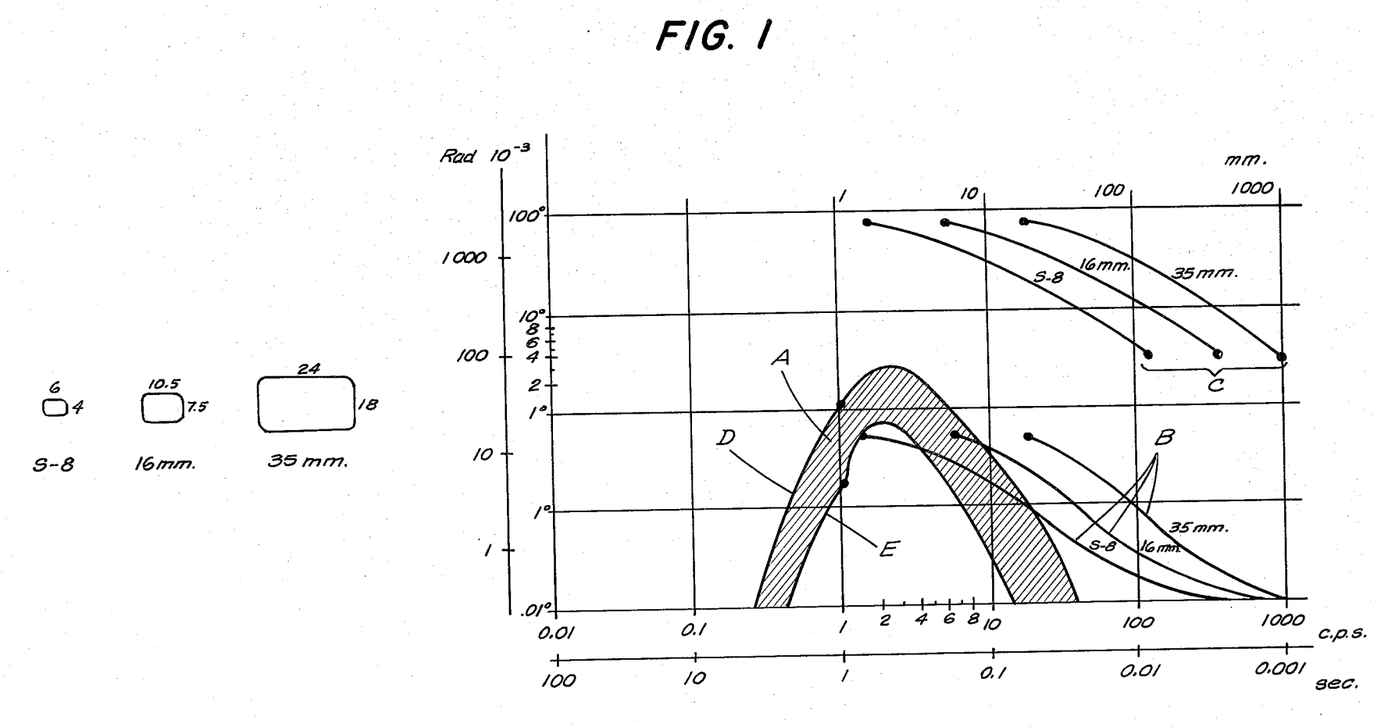
FIG. 1 shows a quantitative summary which can serve as a means for understanding the problem presented by image movement in motion picture cameras equipped with normal optical systems.

With more detailed reference to the drawings, and particularly to FIG. 1, the upper portion thereof shows a diagram of image movement in motion picture cameras equipped with normal optical systems, while the lower portion shows the three film sizes presently employed in this art.

Examination of the figure discloses the following main facts:

a. Image movement is a problem whose gravity depends directly on the focal length used for each film size. In other words, the seriousness of the problem depends on the amplitude of the visual field.

b. The frequency/amplitude pattern of the movements is between 0.25 and 100 cycles per second, maximum amplitudes occurring at frequencies of about 1 cycle per second.

c. The movements produced are clearly detectable when the film is projected on a screen, since they exceed the limit of tolerable motion.

In said FIG. 1, A indicates image movement according to the frequency of such movement (each specific curve depends on the operator and the dynamics of the platform, but lies within the shaded area in the drawing); B indicates the motion limit detectable on the screen according to focal length, C indicates the visual field according to focal length; the curve D indicates movement of the image recorded by a manually operated camera mounted on a vehicle equipped with a tracked shooting platform, and E indicates movement of the motion picture image shot with a manually operated camera.

The lower abscissas of the diagram represent frequency in cycles per second (the upper abscissa) and time in seconds (the lower abscissa), while the upper part of the graph indicates focal length in millimeters; the sweep angle in radians by $10^{-3}$ and in degrees is shown in the ordinates.

In addition to the generally undesirable vibrations illustrated in FIG. 1, motion picture cameras are subject to voluntary angular movements which can be divided into two principal classes, namely tracking and sweep, defined as follows.

Tracking is understood to be any angular movement of the camera necessary to compensate for relative linear speeds which may exist between the camera and its target, due to movement by one or both of them.

It is evident that tracking is achieved by giving the camera angular speed (along its axes of azimuth and elevation) to maintain initial linearity of the image. The (angular) tracking speeds along each axis are governed by the components of the relative camera-target speed and by the distance between them.

In addition to tracking movement, motion picture filming also involves sweep azimuth and elevation movements used to move the camera from one object to another. Such movements are known in film jargon as "panning" (azimuth) and "tilt" (elevation).

Except in very extreme cases, the angular speed necessary for tracking or sweep movements does not exceed 0.75 radians per second (43°/second), although above all in sweeps and with long focal lengths, such angular speed usually is much less, that is, under 4° or 5° per second.

It must be noted that all the foregoing has referred to angular speeds of the camera with respect to inertially stationary space. Such does not limit the generality of this brief discussion of image movement, since any linear speed can always be compensated by a correspondig angular tracking speed to maintain a fixed image, if such is desired.

In summary, the fundamental causes of movement of a motion picture image are three in number:

| 1. Vibrations | — Undesirable |
| 2. Tracking | — Desirable when controlled |
| 3. Sweep | — Desirable when controlled |

Any system of motion picture camera stabilization must permit the operator to perform the functions of tracking and sweep freely, without hindrance, and must simultaneously eliminate flutter from the resulting image.

For this purpose use is always made of frequency discrimination systems, because it is important to note that tracking and sweep movements usually are relatively uniform. Applying that uniformity of tracking and sweep to the amplitude/frequency pattern, it can be said that the "desired" movements are of great amplitude but of low frequency, whereas the undesirable vibrations to be eliminated (according to FIG. 1) are of low amplitude but of higher frequency.

Thus an image stabilizer may be considered to be an optical-mechanical low-pass filter which should operate with a cutoff frequency of about 0.25 cycles per second.

The optimum cutoff frequency is governed by considerations of human engineering. It must never be forgotten that in a motion picture camera stabilized with systems such as those shortly to be described (that is, manually oriented), the operator is an integral and fundamental part of the stabilization system. This system has two essential components: the operator and the stabilizer. The first is responsible for imparting to the camera the desired tracking and sweep movements, which can be nil, while the stabilizer must eliminate vibrations in those frequencies where the operator himself in incapable of doing so.

Figure 2:
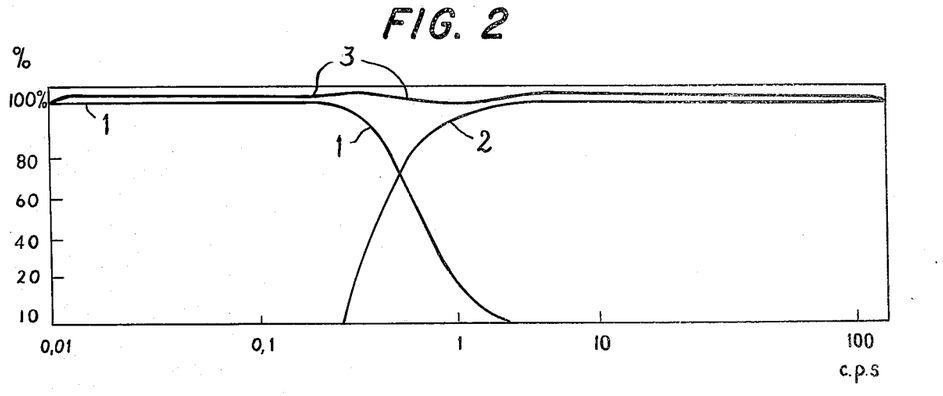
FIG. 2 is a graph illustrating the frequency response of an ideal, manually operated stabilization system.

"Frequency response," or the stabilization capacity of an average human subjected to vibrations, is represented in curve 1 of FIG. 2. The same Figure includes (curve 2) the stabilization characteristics necessary to every system so that the response of the combined system formed by the operator and the stabilizer (curve 3) is perfect throughout the frequency pattern in which significant angular vibrations exist in the camera. That pattern reaches some 100 cycles per second, as shown in FIG. 1. If we apply, to the vibration pattern of FIG. 1, the frequency response curve 2 of FIG. 2, we obtain the vibration shown in FIG. 3. This residual vibration, according to the Figure, is not recorded by any visual field of the camera.

In said FIG. 2, frequency in cycles per second is given in the abscissa, while the ordinate shows the stabilization percentage.

Figure 3:
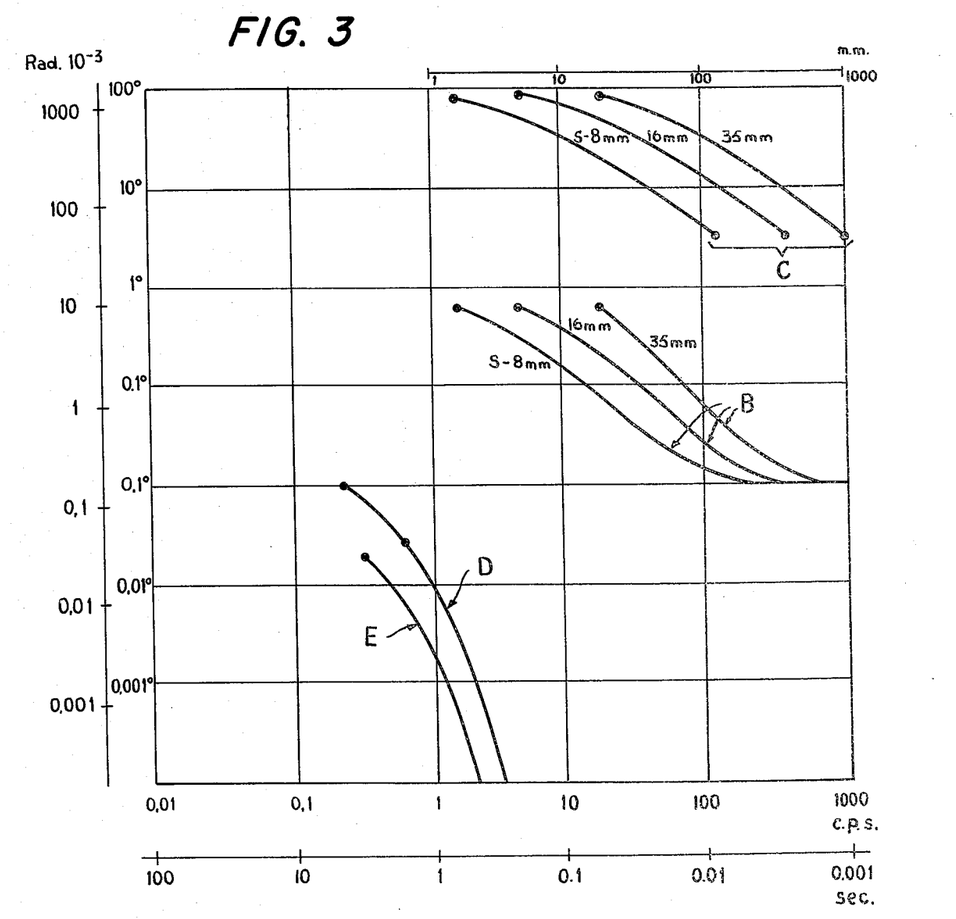
FIG. 3 diagrams the angular vibration of the system used for the graph of FIG. 1, attenuated by an electro-optic stabilization system which acts as a filter of the low-pass type.

In FIG. 3, B represents the limit of movement detectable on the screen according to focal length; C is the visual field according to focal length, while D and E represent, respectively, the attenuated angular vibration of a manually operated camera mounted on a vehicle equipped with a tracked shooting platform and of a camera operated by hand exclusively. In this FIG. 3 the abscissas indicate frequency in cycles per second and time in seconds, while the ordinates represent, the same as in FIG. 1, the angle in radians by $10^{-3}$ and in degrees.

However, vibrations must be eliminated without preventing the operator from imparting necessary voluntary tracking and sweep movements to the camera. The fact that the stabilization systems acts, as has been said, as a low-pass mechanical filter inevitably produces "lag" between the required linearity and that actually taken by the camera at each moment.

Figure 4A:
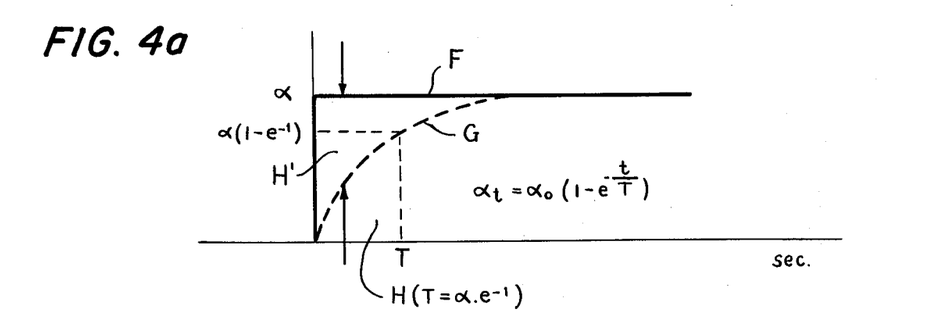
FIGS. 4a, 4b and 4c present different curves corresponding to the angular lag introduced by a stabilization system between the movements of the operator and those of the camera collimation line in three different cases.
Figure 4B:
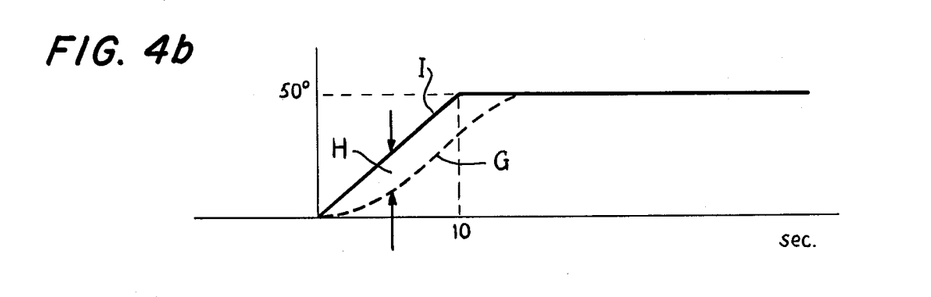
Figure 4C:
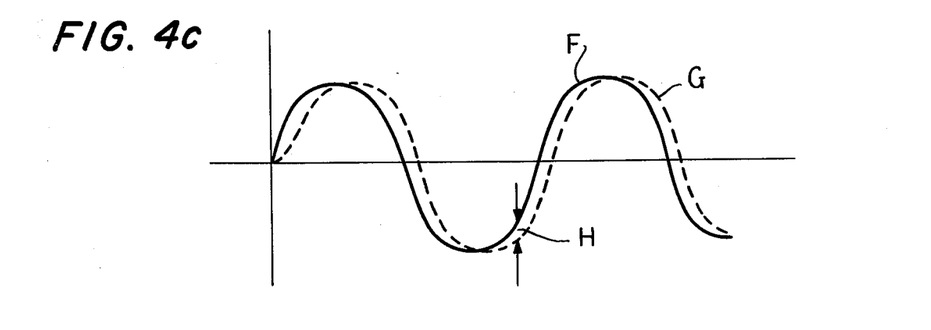

FIGS. 4a–4c illustrate the effects of this lag for various forms of sweep or tracking governed by the operator.

In the first case (FIG. 4a, step sweep) it is seen that the image responds to excitation in this manner by movement the general equation of which is, very approximately:

$$\alpha_t = \alpha_0 \left(1 - e^{-\frac{t}{T}}\right) \quad (1)$$

wherein $\alpha_t$ is the angular position of the image at the instant $t$ in seconds; $\alpha_0$ is the amplitude of the step introduced by the operator in radians or degrees; T is the time constant of the stabilization system in seconds and $t$ is the time variable in seconds.

According to the general theory of filters, the value of the time constant T in a stabilization system is determined as soon as its cutoff frequency is defined in accordance with the expression $$T = \frac{1}{2f_c} \qquad (2)$$

wherein $f_c$ is the cutoff frequency of the filter in cycles per second and T is its time constant in seconds.

The concept "time constant of the stabilization system" we have just defined is extremely useful for three reasons:

1. It fully defines the dynamic characteristics (cutoff frequency and attenuation) of the stabilization system.

2. It is very easy to measure with simple instruments and tools, merely by applying sufficiently rapid traveling so as to be considered a step in the camera, and by measuring the time it takes the image to travel to a position equal to $(1 - e^{-1}) = 0.632$ (that is, 63.2 percent) of the amplitude of the step applied.

3. The "angular lag" introduced by deliberate sweep or tracking movement is a simple function of the time constant of the system.

FIGS. 4b and 4c diagram two other types of sweep or tracking, namely a uniform-speed sweep (FIG. 4b) and a wave sweep of lower frequency than that of the cutoff (FIG. 4c). In said FIGS. 4a–4c the letter I illustrates the movement of the operator's hands, as does the letter F, while G indicates image movement and H represents the angular lag in each case, being H in the case of $T = \alpha.e^{-1}$ and being H in the case of variable angular lag.

For the cited reasons it is best to define the dynamic characteristics of a stabilization system by its time constant rather than by its cutoff frequency. The system to which we have referred and as represented in FIG. 2, which corresponds to a stabilizer with a cutoff frequency of 0.25 cycles per second, may be referred to also as a stabilizer with a time constant of 2 seconds, in accordance with equation (2).

The following is a description of some of the systems used today for image stabilization in this art, and which are based on the theory just explained. Later, description will be made of the new system proposed by the invention, along with an analysis of its operation in comparison with that of other systems.

EXISTING SOLUTIONS IN THE ART

In the market today, there are several types of image stabilizers applicable to motion picture cameras; these will be described briefly here. All operate with considerable efficiency and have the following characteristics in common:

The complement the stabilization capacity of an operator.

They operate as an optical-mechanical low-pass filter having a time constant of about 2 seconds.

Due to their size, cost and handling complexity they are completely incompatible with amateur motion picture cameras and with professional cameras used for on-the-spot news reporting, etc.

The main systems of this type are:

The Dynalens, invented and developed by the present applicant during the years 1962–1965, consisting of an optic stabilizer using a liquid prism controlled by small speed gyroscopes to form two compensator servorings which act on the liquid prism. The deformation of the prism produces shunting by refraction of the light beam passing through, so that vibrations are eliminated while the sweep and tracking movements are allowed to pass. The Dynalens operates with a time constant of about 1 second.

The limitations of the Dynalens result from its cost (and its technical restrictions), for the inherently high cost of approximately 292,000 pesetas (about $5,000) is due principally to its unique design and the use of electronic miniaturized speed gyroscopes, which are costly and require complex electronic systems for power and function.

In addition, the correction angle of the Dynalens is limited to ±5° due to the chromatic dispersion which occurs in the liquid prism when that correction level is exceeded. This fact affects the stabilizing capacity of the system, for if it is adjusted to operate with an optimum stabilization time constant of about 2 seconds, as has been indicated, the tracking and sweep speed is severely limited by the limitation of the lag angle imposed by those 5° of correction capacity of the liquid prism.

Therefore, in the Dynalens comprise must be made between the stabilization requirements and those of sweep and tracking. In practice such compromise consists of adjusting the time constant of the system to a value of approximately 1 second. It is thereby possible to achieve sweep speeds of up to 10° per second prior to reaching the limits of the liquid prism. While both parameters (time constant and maximum sweep speed) differ from the optimum, nevertheless the general result of the system is quite satisfactory, as evidenced by the large number of persons who have used and continue to use the Dynalens.

ISOLATION STABILIZERS

Since 1965, various isolation stabilizers for cameras have appeared in the market, especially for filming from helicopters. Obviously, such equipment is not used by amateur filmmakers or professional news reporters. Good results are obtained in professional motion picture making, where cameramen have a high level of training and experience. Cost is more or less that of the Dynalens.

Technically, isolation stabilizers function according to the principles explained at the beginning of this specification, in this case including the operator inside the stabilized structure. They are generally adjusted for time constants of about 2 seconds, their function is based purely on the inertia of the operator-camera-counterweight system and they demand careful balancing to function properly. Vibration isolators are, basically, units of springs and shock absorbers supporting a platform for the operator and an arm for the camera equipped with a counterweight which produces a zero moment in the azimuth and elevation axes. Thus the purest possible mechanical filter is created, with consequences similar to those of the Dynalens.

The arrangement according to the invention overcomes all the inconveniences previously mentioned in relation to existing devices of this nature in the prior art, inasmuch as it is based on a system of gyroscopic reference which makes use of a magnetic stabilization system to obtain dynamic characteristics exactly the same as those required for the manual system used by operators.

The following is a detailed description of the arrangement forming the object of this application, with combined reference to FIGS. 5, 6a, 6b and 7 to 10, the last of which represents the unit of a normal type motion picture camera incorporating the stabilization arrangement according to this invention.

Figure 10:
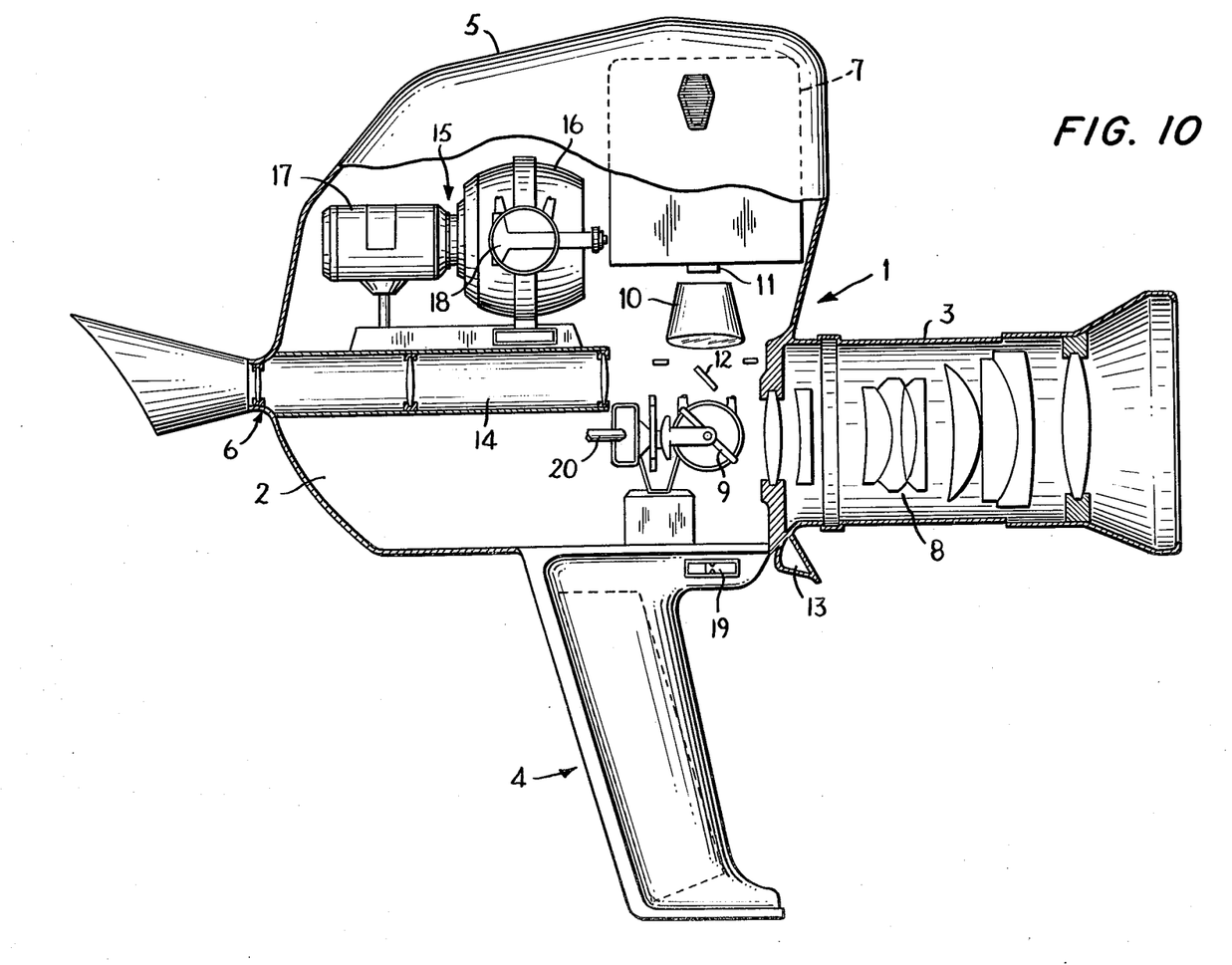
FIG. 10 is a diagram of the structure of a motion picture camera incorporating the device according to this application.

Said FIG. 10 illustrates the stabilization system just as it is generally conceived today for a zoom proportion of 8/1 and a Super 8 camera lens.

The optical system employed is the usual so-called varifocal system (200 meters), modified to obtain a greater visual field than normal for the afocal part of the lens. The requisites of the visual field of the afocal converter are those normally associated with the lens plus the angle of correction necessary to avoid reduced illumination at the edges of the image due to the compensation motion of the reflection element. Said FIG. 10 illustrates a camera having a double-lens layout such as that used, for example, in the commercially available Bolex 155 Super 8. It is possible to achieve other layouts which require a longer pencil of light in the collimated light beam, between the varifocal and main elements of the telephoto lens.

With reference in particular to FIG. 10 of the drawings, in a general manner a camera incorporating the arrangement according to the invention is identified as 1. Said camera contains a body 2, forward from which extends a tubular member 3 designed to receive the lens assembly of the camera, and a grip 4 containing the electric batteries to power the various drive components of the camera; the lens assembly of the viewer is marked in a general manner as 6. The housing 5 is joined in a detachable manner to the body 2, and contains the unexposed film in a cassette-type cartridge provided with an opening 11 which determines the exposure plane of the film. The tubular member 3 holds the lens system 8 (which includes the afocal converter), and the already-collimated beam which leaves this lens system strikes a compensator mirror 9 mounted in a cardan suspension arrangement which will be detailed below. The light beam reflected by this compensator mirror passes through the main lens 10 of the camera after being split in the fixed beam-splitter 12, and strikes the film to be exposed in the image plane 11. The beam split by the fixed beam-splitter 12 is cast horizontally through the lens 14 of the viewer 6.

The cited housing 5 also contains a stabilizing gyroscope arrangement 16 connected to an electric driving micromotor 17. This arrangment according to the principles of the invention is illustrated generally with the number 15. The connection-disconnection switch 19 is for activating the stabilization arrangement of the camera according to the invention, and numbers 18 and 20 indicate, respectively, the transmission systems from the gyroscope drum 16 to the compensator mirror 9.

The two fundamental elements of the camera according to the invention illustrated in FIG. 10 are the following:

a. The magnetic damping and variable gap gyroscope 16 (GAMEV); and b. The variable ratio transmission 17 and 20.

The gyroscope 16 which will be described below in greater detail is the inertial reference of the system and the key to this invention. Due to its gyrodynamic properties, the GAMEV has ideal characteristics for maintaining optimum linearity when its support is subjected to vibrations such as those of FIG. 1. The principle of this stabilizer element has been the subject matter of Spanish Patent Application No. 397.319, (corresponding to U.S. patent application Ser. No. 348,171, filed Apr. 5, 1973) of which the present applicant is also owner, and thus only a brief general description of it will be given here for illustrative purposes.

The purpose of the variable ratio transmission, in turn, is to make the first reflector mirror (compensator mirror 9) move downward in control of the gyroscopic stabilizer 16 so that the light beam moving towards the film remains parallel to the output shaft of the stabilizer 16. Hydraulic systems (as represented in the illustrative example in FIGS. 7 and 8 of the drawings) or mechanical systems as described as follows are used for this purpose.

Figure 5:
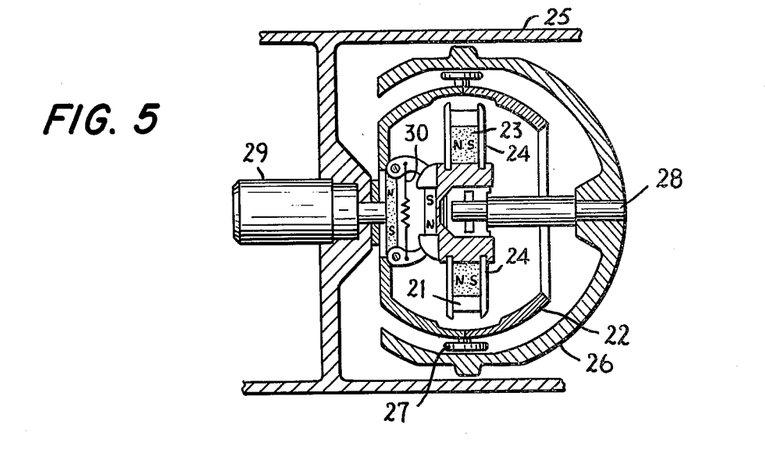
FIGS. 5, 6a and 6b diagram the gyroscopic stabilization arrangement in accordance with the present invention, for incorporation into a motion picture camera.

The gyroscopic stabilizer 16 is an inertial reference consisting of a gyroscope 21 (see FIG. 5), linked magnetically to an almost spherical drum 22 which rotates concentrically and in a synchronized manner with the gyroscope 21, as shown in said FIG. 5. The gyroscope 21, with 2° freedom (azimuth and elevation), is formed by a permanent ring-shaped magnet 23 the entire surface of which is axialy magnetized. The magnetic flux is channeled towards the drum 22 by means of two polar members 24 and 24' of high magnetic permeability, in such manner that the desired magnetic flux density is achieved in the gap. FIG. 5 shows the structure 25 of the camera, and the secondary cardan suspension ring 26 and primary cardan suspension ring 27 for the stabilizer, the secondary cardan suspension ring 28 forming one unit with the gyroscope.

The gyroscope 21 and the almost spherical drum 22 rotate in synchronization, driven by an electric micromotor 29 whose output shaft forms one piece with the almost spherical drum 22, along the geometric axis of the latter. The gyroscope is synchronically driven by means of a mechanical universal joint or an adequate magnetic driving mechanism 30 (what is illustrated in FIG. 5).

Figure 6A:
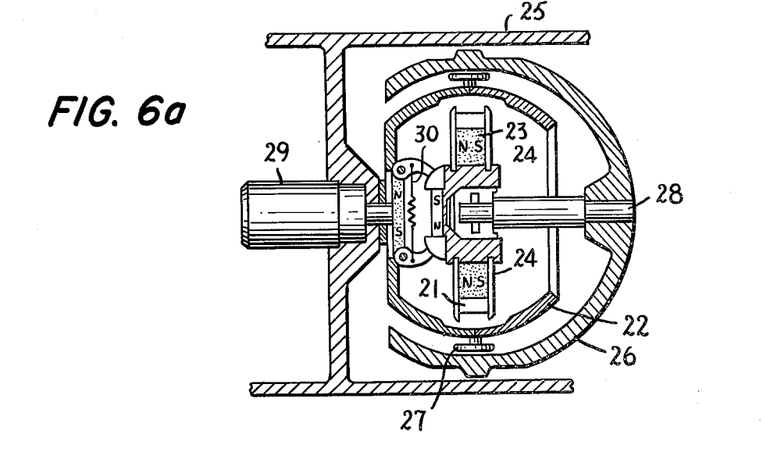
Figure 6B:
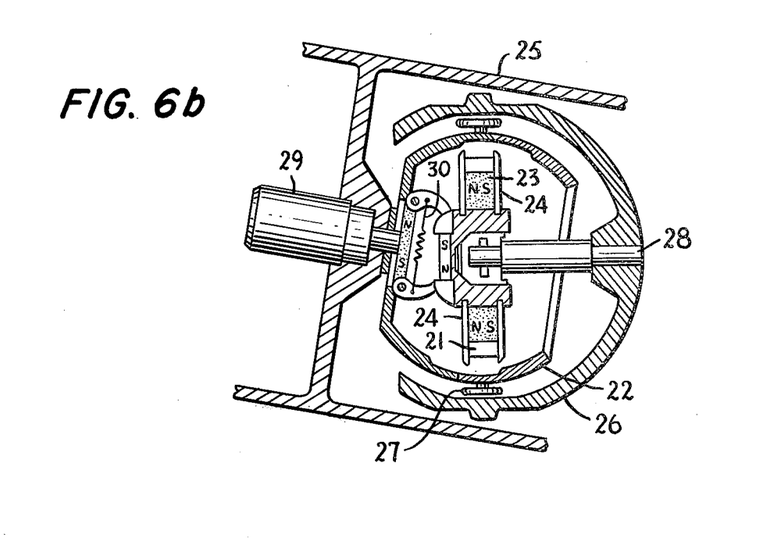
Figure 7:
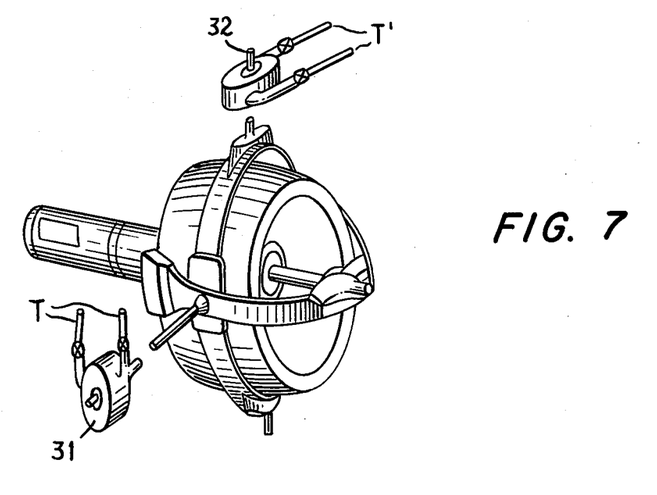
FIGS. 7 and 8 diagram the systems for transmission of movement between the gyroscopic stabilization arrangement according to the invention (FIG. 7) and the stabilized reflection means of the camera (FIG. 8)

FIGS. 6a and 6b represent, respectively, the gyroscopic stabilizer aligned and disaligned with the geometric axis of the camera. In the former, the gyroscope and the drum do not move relatively, the magnetic forces thus being completely equal, the gyroscope 21 acting as a normal free gyroscope.

Figures 8, 9:
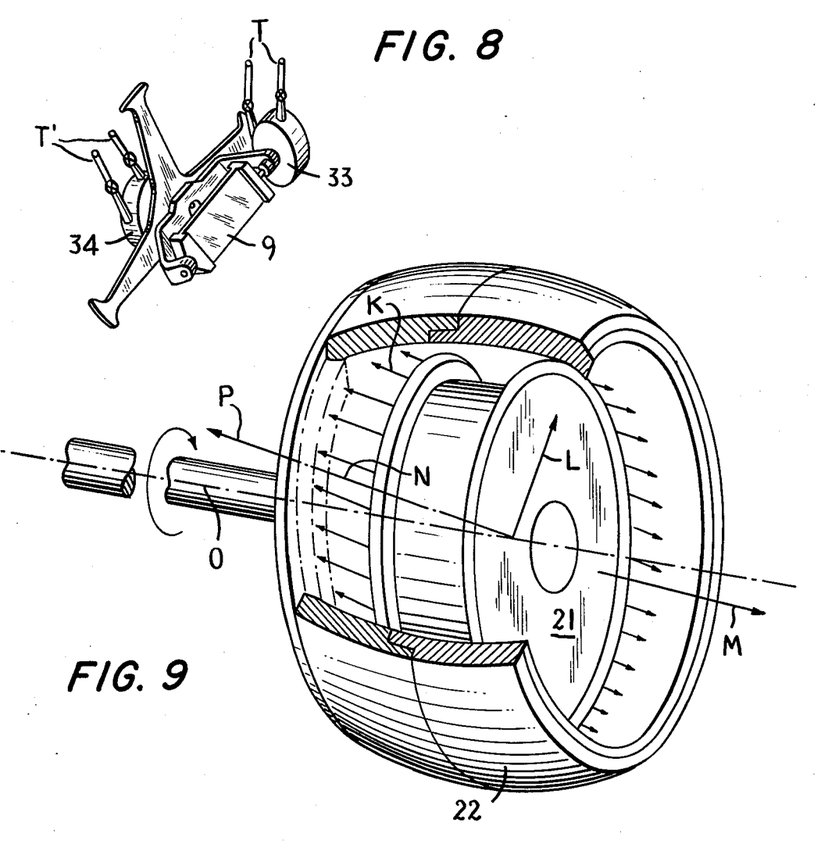
FIG. 9 is a diagram showing the generation of the moment of magnetic coupling in the stabilizer device of FIGS. 5, 6a and 6b.

When there is disalignment between the drum 22 and the gyroscope 21 (FIG. 6b), each radial element of the latter "rakes" or "sweeps" the almost spherical drum 22 in each revolution with a sinusoidal movement. Such sweeping, which supposes movement from the magnetic flux high density zones, creates eddy currents induced in the high-conductivity layer which internally lines the surface of the almost spherical drum 22. The generation of these eddy currents, which at each clearance point are proportional to local sweep velocity, create counterelectromotive forces which in turn produce moments between the gyroscope and the almost spherical drum. This latter is represented in FIG. 9, which illustrates the spatial relationship corresponding to the condition of FIG. 6b, and in which it is shown that the resulting moment of magnetic coupling is displaced 90° from the axis of disalignment between the gyroscope 21 and the drum 22. In said FIG. 9, K indicates the power elements, L is the resulting moment, M is the integration of elemental forces (components of the resulting moment), N is the disalignment axis, O the drive shaft of the motor 29 and P the integration of elemental forces (component of the resulting moment, equivalent to M).

As a result of that moment between the gyroscope and the spherical drum, the first of these wanders. Evidently, the axis of precession is moved 90° with respect to the axis of the acting moment; therefore, the precession of the gyroscope induced by the magnetic coupling makes it move around its displacement axis, and consequently makes the gyroscope realign itself anew with the almost spherical drum 22 without spiral movement, rotating always and exclusively along the plane of initial disalignment.

This unique property of the gyroscope stabilizer 16 is what distinguishes the concept of the arrangement according to the invention from all other present systems, and which makes it an ideal reference system for stabilized systems with manual control.

The dynamics of this stabilizer has been analyzed quantitatively to determine its feasibility with available materials (magnetic and others). Such anaylsis has proven the feasibility of the concept.

Reference was made earlier in the specification to an almost spherical drum 22. The qualifier "almost" results from the convenience of introducing variable clearance in the stabilizer device as has been illustrated in FIGS. 6a and 6b.

It is evident that magnetic flux density in the clearance of the stabilizer depends on its length, and that the magnetic coupling between the gyroscope 21 and the drum 22 depends on that flux density. Thus in order to achieve a constant (time constant) in the dynamics of the device, it is necessary to obtain certain flux density in the clearance (of course, once the other gyroscopic parameters have been fixed, such as the inertia moment, angular rotation velocity, etc.).

By making such clearance less when the angle of disalignment is increased, it is possible to make the time constant of the stabilizer be a function of its angle of disalignment. This simple fact allows design commitments to be avoided which must be heeded in other inertial stabilization systems, since it is possible to construct a stabilizer 15 having ideal stabilizing characteristics (T=2 seconds) when the sweep and tracking speeds are nil, but which sacrifices that ideal stabilization in favor of a smaller delay angle when the sweep and tracking speeds must increase due to filming speeds.

This unique property has been analyzed with enormously positive results, and this so-decisive advantage of the arrangement over other known systems of stabilization is achieved with minimum cost, since it depends only on the geometric shape of the inner surface of the drum 22.

The placement of the compensator mirror 9 in the rear part of the afocal converter of the lens system 8 of the motion picture camera is due to three principal circumstances, namely: (1) the light beam is collimated in that area, and thus the mirror and its movement do not create any sort of secondary optic distortion; (2) due to the parallel nature of the light beam in this area, the length of the beam can be reasonably extended to the main lens 10, thereby accommodating the other control and observation elements of the image; and (3) the diameter of the collimated light beam in that area is very small in comparison with the diameter in any other area of the optic beam common to the image system in film and viewer.

In exchange for such advantages, the fact must be accepted that the presence of the compensator mirror 9 behind the afocal converter 8 makes it necessary to establish a variable ratio mechanism (see FIGS. 7 and 8 of the drawings) between the stabilizer device 15 and the mirror 9. The reason for this is that the extension or reduction produced by the afocal converter is a factor independent from the camera movements with respect to inertial space, which are those detected and corrected by the stabilizer device 15.

While various types of variable ratio transmission mechanisms have been designed, this aspect of the invention — although of great importance — can be solved with usual designs known both in mechanical art and in the field of high precision hydraulic transmission, which do not warrant the creation of new technology. Thus in this respect, the invention merely illustrates an example of the possible systems represented by FIGS. 8 and 9, and which consists of a fixed-displacement position transmitter (elevation) 31 and a fixed-displacement position transmitter (azimuth) 32 which control, by means of the hydraulic lines T and T', a fixed-displacement position receiver 33 and a variable-displacement position receiver 34 (see FIG. 8).

The motion picture camera 1 represented in FIG. 10, which includes the stabilization arrangement according to this invention as well as its optic system 8, is of the usual type in all other aspects. It must be noted, however, that while the lens system is usual, it must be especially redesigned and constructed for cameras incorporating the stabilization arrangement according to the invention. The reason for this is that the field of vision needed in the afocal converter includes that of the principal lens 10 plus that necessary for stabilization. For the design and construction of prototypes, this requisite can be met by using an afocal converter designed for a size larger than that of the main lens. However, for the final design and for mass production it is evident that final characteristics may be perfected by the planning and construction of a special new optical train.

With respect to the other characteristics of the camera 1, evidently these must include those existing in modern cameras of medium, high and very high category, since it is logical to assume that the eventual user of a camera incorporating the arrangement according to the invention will be an advanced amateur, who wishes to enjoy the very important innovation of stabilization of a camera equipped with many of the modern secondary systems available.

It should be mentioned here, finally, that the basic concept of the arrangement of this invention evidently must be incorporated in a camera specifically designed to adopt this new and unique system of inertial stabilization.

Although in the foregoing, description and illustration have been made of an exemplary preferred embodiment of the invention, it will be understood that experts in the art may introduce a variety of variations in the arrangement of the members, for example with respect to the movement transmission systems, without such departing from the spirit or scope of the invention, limited only by the attached claims.

What is claimed is:

1. In a motion picture camera having a variable focal length lens system including a focal converter and a film exposure window formed therein behind which film to be exposed passes; an image-movement compensation device for improving the definition of images recorded by the camera when the camera is subjected to vibrations; said device comprising a reflecting element mounted in said camera to reflect a collimated light beam from said focal converter to the film passing said exposure window; means for mounting said reflecting element in the camera for pivotal movement at the point of incidence of said light beam therewith in the elevation and azimuth planes of said camera; magnetically damped gyroscopic stabilization means for controlling the spatial position of said reflecting element in the camera, and transmission means operatively connected between said stabilization means and said reflecting element for pivoting said reflecting element in response to relative displacement of the stabilization means, whereby the light beam reflected from the reflecting element to the film is substantially unaffected by vibrations to which the camera is subjected and the point of incidence of the reflected light beam on the surface of the film at the exposure window remains substantially constant, said stabilization means comprising an actuating motor having an output shaft, a partly spherical drum operatively connected to said shaft for concentric rotation therewith, a permanent magnet ring shaped gyroscope; means for mounting said gyroscope within said drum for pivotal movement in the elevation and azimuth planes; and means operatively connecting said output shaft to said gyroscope for rotating said gyroscope while allowing movement of the gyroscope in the elevation and azimuth planes independently of said shaft, whereby said gyroscope is magnetically linked to said drum and damped by the effects of eddy currents resulting from its interaction with the drum to thereby maintain a relatively fixed position in the camera when the camera suffers a brusque movement of low amplitude and high frequency.

2. The device as defined in claim 1 wherein said means for mounting the reflecting element in the camera comprises a swivel-based frame mounted in the camera for pivotal movement in the elevation and azimuth planes operatively connected to said transmission means for movement thereby in response to relative movement between said drum and said gyroscope; said means for mounting the gyroscope within said drum comprising a cardan-type suspension.

3. The device as defined in claim 2 wherein said cardan-type suspension and transmission means is adopted to change their transmission ratio in response to adjustment of the effective lens focal length of the camera.

4. The device as defined in claim 3 wherein the focal portion of the visual field of said lens system is wider than normally required and the requirements of the visual field are those normally associated with the lens used, plus the angle of correction required to avoid reduced illumination at the edges of the image due to compensation movements made by the reflection element.

5. The device as defined in claim 4, wherein said transmission means comprises a variable-displacement position receiver means allowing a 1:2 ratio of motion on the elevation plane as well as a 1:1 ratio of motion on the azimuth plane, multiplied on both planes by a factor proportional to the increase or reduction of the focal converter.

6. The device as defined in claim 1 wherein said partly spherical drum and said gyroscope are respectively dimensioned to define a variable clearance space between the magnetized periphery of the gyroscope and the concave face of the partly spherical drum; said space varying in accordance with the position of said gyroscope.

* * * * *